(12) United States Patent
Hobbs et al.

(10) Patent No.: US 9,504,242 B2
(45) Date of Patent: Nov. 29, 2016

(54) DEVICE FOR WEED CONTROL

(75) Inventors: Richard Hefford Hobbs, St. Neots (GB); Jason Peter Morehen, St. Neots (GB); Malcolm Bruce Myers, St. Neots (GB)

(73) Assignee: Weeding Technologies Limited (GB)

( * ) Notice: Subject to any disclaimer, the term of this patent is extended or adjusted under 35 U.S.C. 154(b) by 252 days.

(21) Appl. No.: 13/884,159

(22) PCT Filed: Nov. 8, 2011

(86) PCT No.: PCT/GB2011/052174
§ 371 (c)(1),
(2), (4) Date: Dec. 30, 2013

(87) PCT Pub. No.: WO2012/063060
PCT Pub. Date: May 18, 2012

(65) Prior Publication Data
US 2014/0103138 A1    Apr. 17, 2014

(30) Foreign Application Priority Data

Nov. 9, 2010 (GB) .................................... 1018912
Jul. 28, 2011 (GB) .................................... 1112956

(51) Int. Cl.
*A01M 7/00* (2006.01)
*A01M 21/04* (2006.01)

(52) U.S. Cl.
CPC ........... *A01M 7/0042* (2013.01); *A01M 21/04* (2013.01)

(58) Field of Classification Search
CPC .. A01M 7/0042; B05B 7/1673; B05B 7/166; B05B 9/002; B05B 7/1693; B60S 1/488; B60S 1/52; B60S 3/047

USPC ....... 239/720, 135, 130, 131, 136, 159, 172, 239/164, 128, 137; 111/127; 47/1.5
See application file for complete search history.

(56) References Cited

U.S. PATENT DOCUMENTS 3,001,720 A * 9/1961 Cartwright ............ E01C 19/174
239/112
3,425,407 A * 2/1969 Reginald ............... A01M 13/00
126/271.2 C (Continued)

FOREIGN PATENT DOCUMENTS

DE    3401734 A1    3/1987
DE    101 06 895 A1    5/2002

(Continued)

OTHER PUBLICATIONS

International Search Report and Written Opinion for International Application No. PCT/GB2011/052174 dated Mar. 26, 2012.

(Continued)

*Primary Examiner* — Arthur O Hall
*Assistant Examiner* — Joseph A Greenlund
(74) *Attorney, Agent, or Firm* — Tumey L.L.P.

(57) ABSTRACT

An apparatus suitable for controlling vegetation which apparatus comprises a hot-liquid reservoir (28), release means (38) connected to the hot-liquid reservoir (28) and at least one nozzle (74), for applying a stream of foam that contains steam, connected to the reservoir through the release means. The apparatus includes a heating means (34) to keep the liquid hot so the pressure is above atmospheric pressure. The liquid may be pumped by a pump (36) through the hot-water reservoir (28), the water being heated on demand by heaters (34) within the reservoir (28). The apparatus is either propelled by or mounted on a vehicle; and during use of the apparatus to control vegetation the vehicle provides power (24) to the heating means.

11 Claims, 3 Drawing Sheets

(56) References Cited

U.S. PATENT DOCUMENTS

| | | | | |
|---|---|---|---|---|
| 3,481,545 A * | 12/1969 | Henry | A01B 69/022 | 111/33 |
| 4,030,244 A * | 6/1977 | Tennes | A01M 7/0014 | 239/121 |
| 4,340,174 A * | 7/1982 | Regan | F24H 1/50 | 122/25 |
| 4,529,104 A * | 7/1985 | Tyler | A01C 15/04 | 222/146.2 |
| 4,763,836 A * | 8/1988 | Lyle | A01G 25/09 | 239/243 |
| 4,991,342 A * | 2/1991 | Maher | A01D 82/00 | 47/1.7 |
| 5,004,156 A * | 4/1991 | Montanier | B05B 3/06 | 15/340.1 |
| 5,054,688 A * | 10/1991 | Grindley | B05B 7/005 | 169/15 |
| 5,085,371 A * | 2/1992 | Paige | B05B 7/0062 | 239/343 |
| 5,213,263 A | 5/1993 | Corona | | |
| 5,297,730 A * | 3/1994 | Thompson | A01M 7/0042 | 239/13 |
| 5,385,106 A * | 1/1995 | Langshaw | A01G 11/00 | 111/118 |
| 5,419,487 A * | 5/1995 | Nielsen et al. | | 239/10 |
| 5,472,009 A * | 12/1995 | Linderoth | A01M 7/0089 | 137/101 |
| 5,485,962 A * | 1/1996 | Moss | A01C 15/04 | 239/655 |
| 5,575,111 A * | 11/1996 | Rajamannan | A01M 21/04 | 43/138 |
| 5,622,123 A | 4/1997 | Rajamannan | | |
| 5,826,522 A * | 10/1998 | Anders | A01C 23/024 | 111/119 |
| 5,848,492 A * | 12/1998 | Brown | A01G 11/00 | 47/1.44 |
| 5,867,935 A * | 2/1999 | Brown | A01G 11/00 | 122/460 |
| 5,927,607 A * | 7/1999 | Scott | B05B 3/0422 | 137/514.5 |
| 5,947,141 A * | 9/1999 | Nuss | A01M 7/0042 | 137/268 |
| 5,964,179 A * | 10/1999 | Holloway, Jr. | A01B 69/022 | 116/201 |
| 6,029,589 A | 2/2000 | Simpson | | |
| 6,047,900 A * | 4/2000 | Newson | B05B 9/002 | 239/135 |
| 6,073,859 A * | 6/2000 | Gorgens | A01M 21/04 | 239/128 |
| 6,119,963 A * | 9/2000 | Bastin | A01M 7/0075 | 239/168 |
| 6,345,772 B1 * | 2/2002 | Bastin | A01B 69/022 | 160/163 |
| 6,363,654 B2 * | 4/2002 | Prull | A01M 21/04 | 47/1.44 |
| 6,969,010 B1 * | 11/2005 | Kriegshauser | A01M 7/005 | 239/170 |
| 8,622,653 B2 * | 1/2014 | Lipes | A61L 2/04 | 111/120 |
| 2005/0005509 A1 * | 1/2005 | Tindall | A01M 21/04 | 47/1.01 R |
| 2005/0116071 A1 | 6/2005 | Rajamannan | | |
| 2006/0086296 A1 * | 4/2006 | Wichmann | A01C 23/042 | 111/127 |
| 2007/0227418 A1 * | 10/2007 | Polfer | A01B 39/18 | 111/127 |
| 2014/0096443 A1 * | 4/2014 | Hobbs | A01M 21/043 | 47/1.5 |

FOREIGN PATENT DOCUMENTS

| | | |
|---|---|---|
| EP | 0920802 A1 | 9/1999 |
| EP | 1772397 A2 | 4/2007 |
| EP | 2 022 329 A2 | 2/2009 |
| FR | 2555469 A1 | 5/1985 |
| FR | 2678181 A1 | 12/1992 |
| GB | 2273430 A | 6/1994 |
| GB | 2332849 A | 7/1999 |
| JP | 2011015661 A | 7/2009 |
| NZ | 237524 A | 4/1995 |
| WO | WO 02/07513 A1 | 1/2002 |
| WO | WO 03/026414 A1 | 4/2003 |

OTHER PUBLICATIONS

Great Britain Search Report for Great Britain Application No. GB 1112956.6 dated Nov. 28, 2011.
English Translation of Denmark Abstract for Denmark Application No. DK173373 B1 dated Jul. 8, 1999.
Great Britain Search Report for Great Britain Application No. GB 1119235.8 dated Mar. 8, 2012.
Great Britain Search Report for Great Britain Application No. GB 1112955.8 dated Nov. 28, 2011.
Great Britain Search Report for Great Britain Application No. GB 1018912.4 dated Mar. 9, 2011.
Great Britain Exam Report for Great Britain Application No. GB 1119250.7 dated Sep. 18, 2014.
Great Britain Search Report for Great Britain Application No. GB 1119250.7 dated Sep. 17, 2014.

* cited by examiner

DEVICE FOR WEED CONTROL

The present invention relates to a method of controlling vegetation and to an apparatus for performing the method.

Conventionally, vegetation, such as weeds, is typically controlled either by physical removal, such as hand weeding, or by the use of herbicides. Hand weeding can be very hard work. Plants are becoming increasingly resistant to herbicides. In addition, there is increasing public resistance to the use of chemicals in the environment, and legislative changes to reduce use of toxic chemicals as herbicides. Therefore, there is an interest in methods of controlling vegetation which do not use synthetic chemicals and avoid hand weeding.

Thermal methods have been suggested for weed control. A variety of methods have been used to provide heat to weeds, for example, hot water, steam, hot air, flames and hot foam. These methods can overcome some of the disadvantages of herbicides such as spray drift and soil or groundwater pollution. EP 1 450 603 discloses a method of controlling vegetation including preparing a foam having a temperature of between 75° C. and 100° C. and consisting volumetrically of 60 to 75% aqueous solution of biodegradable foaming agent and 40 to 25% air and directing a stream of foam on the vegetation.

The present invention seeks to provide a mobile apparatus for use in controlling vegetation.

The present invention provides an apparatus suitable for controlling vegetation which apparatus comprises a reservoir for a hot liquid, release means connected to the reservoir, and a nozzle for applying a stream of foam containing steam, connected to the reservoir through the release means, the apparatus being mounted on a wheeled trolley or trailer which may be propelled by a vehicle, or the apparatus being mounted on a vehicle. The vehicle may be, for example, a tractor or quad bike.

The hot-liquid reservoir may be a reservoir which comprises a heating means and the heating means is connected to a power source such as the mains electricity or a battery. The reservoir may therefore heat liquid only on demand, rather than storing heated liquid. The heating means is typically a heating element. The apparatus may comprise an input for mains power and a heating element suitable for connection to mains power. Where the reservoir is used in conjunction with a motor vehicle (such as a tractor), the electrical power may be generated by the vehicle. When the apparatus is connected to a source of power, the relevant heating element or elements may be arranged to heat the liquid until the pressure in the reservoir is above atmospheric pressure. In the case of water, a suitable temperature is between 95° and 105° C. The release means controls and restricts the outflow of liquid, while the pressure within the hot-liquid reservoir remains above atmospheric pressure. For example the pressure may be between 125 kPa and 300 kPa (absolute), preferably between 175 kPa and 275 kPa, for example about 200 kPa or 225 kPa.

The pressure in the hot-liquid reservoir may additionally be raised by a pump. For example the pressure may be up to 1.5 MPa (15 atmospheres), more preferably up to 1.2 MPa, for example 1000 kPa or 500 kPa.

Optionally the liquid in the hot-liquid reservoir may be heated by a burner system which may be powered by a fuel such as gas, diesel or biofuel. This is applicable where the apparatus is a wheeled apparatus or a vehicle or trailer-mounted apparatus.

The hot-liquid reservoir of the wheeled trolley apparatus or vehicle or trailer-mounted apparatus may be a container which can maintain a liquid at a temperature of from 96° C. to 105° C. for up to an hour without using mains or vehicle power. The reservoir may therefore be insulated. Power or heat may be provided by the vehicle or towing vehicle from the alternator in its engine to generate electrical power, or from a heat exchanger directly connected to the vehicle to extract thermal energy from the vehicle, to maintain the temperature of the liquid in the reservoir typically for an hour or more.

The hot-liquid reservoir for a wheeled trolley mounted apparatus typically can hold a volume of liquid of up to 30 liters, preferably from 5 to 25 liters, more preferably from 10 to 20 liters. The hot-liquid reservoir may contain all the liquid required by the apparatus. Alternatively the apparatus may also include a storage tank for liquid which may be at ambient temperature, and means to supply liquid from the storage tank to the reservoir, where it is heated. In this case the volume of the hot-liquid reservoir can be much less, as it need only contain the liquid required for immediate use, as it heats liquid only on demand, rather than storing heated liquid. The total liquid capacity for an apparatus placed in a trailer or on a vehicle will depend on the size and carrying capacity of the trailer or vehicle, but it may be more than 2000 liters, more typically up to 1000 liters, for example up to 600 liters for a vehicle such as a tractor, and for a smaller vehicle or trailer more preferably up to 350 liters, and is typically up to 150 liters, for example from 75 to 125 liters, such as about 100 liters.

The liquid supplied to the reservoir is typically water combined with a surfactant. The surfactant is typically used at a concentration of up to 2%, preferably 0.05% to 2%, more preferably from 0.1% to 1%, more preferably about 0.1%. The surfactant may be organic or inorganic. The surfactant is preferably a biodegradable foaming agent such as alkyl polyglycoside and is preferably a natural product. The surfactant may be mixed with the liquid in the reservoir, or it may be mixed with the hot liquid as it is dispensed from the reservoir.

The release means, for example, is a valve which allows liquid to exit from the reservoir when open. In one embodiment, the valve allows a limited pressure to build up in the reservoir so as to cause the liquid to exit from the nozzle when the valve is released. The apparatus may include a pressure sensor to prevent the pressure from becoming too high in the reservoir. However, as mentioned above, the pressure in the reservoir may be raised partly by heating the liquid and partly by a pump, so as to achieve a higher pressure.

The release means may be connected to the reservoir at the bottom, side or top of the reservoir. In a preferred embodiment the release means is connected to the bottom of the reservoir.

The reservoir may also have an opening for the surfactant. This may be, for example, a bottle of surfactant with a drip feed or it may be a 'tablet holder', an opening into the reservoir where a grid separates the surfactant from the main section of the reservoir. In this embodiment a tablet could be placed on the grid and the cap closed. Water is then added to the reservoir and heated, which causes the tablet to dissolve through the grid and mix into the liquid in the reservoir.

The nozzle may have a single hole. The nozzle is typically a directional nozzle so that the hot foam produced by the apparatus can be directed accurately onto vegetation. Alternatively the apparatus may be provided with interchangeable nozzles to enable cleaning of the apparatus and in order to change nozzle geometry easily. In another embodiment, a nozzle with variable geometry may be provided such as a nozzle that can provide either a jet or a mist of foam. The nozzle may have multiple openings which enables foam to be directed at several points around the base of a weed simultaneously.

An embodiment suitable for use with a vehicle such as a tractor, or mounted on a vehicle, may include several nozzles, so that a wide area of ground can be treated in one pass of the vehicle.

Where the nozzle has a single hole, the hole in the nozzle is typically up to 2 mm or 3 mm in diameter, more preferably up to 1 mm. However, the size of the nozzle hole also depends on the configuration of the apparatus.

The apparatus may further comprise a shroud for the nozzle. Thus the nozzle may be mounted within or inside a shroud or may be enclosed on one side by a shroud. The nozzle and shroud may be a single item or may be made of separate components. Where the nozzle and shroud comprise separate components the shroud may be removable from the apparatus. The shroud may be of a size so as to cover a small weed, thus creating a steam/foam chamber, and providing a thermal blanket effect. Where the nozzle and shroud or a plurality of nozzles and shrouds are used while moving the associated vehicle, each shroud may be arranged to enclose respective nozzles at the front and sides, leaving an opening at the rear, relative to the direction of movement.

In one embodiment each nozzle is supported by a support bar that includes a hinge, so that if the nozzle collides with an obstruction as the apparatus is moved over the ground, the nozzle can swing back to clear the obstruction.

A preferred embodiment comprises several nozzles arranged in groups, the orientation of the group of nozzles being adjustable. Each group of nozzles may be associated with a respective shroud. For example a trailer carrying the nozzles may comprise a horizontal support element that carries the groups of the nozzles at positions that are spaced apart along the horizontal support element. By changing the orientation of the nozzles within each group, the distribution of foam over the ground can be altered. For example the nozzles within each group may be aligned generally parallel to the direction of movement, for example to kill weeds growing in the gaps between rows of crop plants without affecting the crop plants. If each group of nozzles is turned so as to extend transverse to the direction of movement, this increases the width of ground treated by each group of nozzles. The spacing between the groups of nozzles may be such that in this orientation there are no gaps between the strips of ground treated by the groups of nozzles, so the entire surface area is treated.

Where the apparatus comprises one or more heating elements, then each heating element is typically connected to a thermostat or a thermocouple which is used to turn the heater off when the liquid reaches the required temperature. The apparatus may include a plurality of heating elements, arranged so that the liquid is heated successively by the heating elements. For example there might be three heating elements in the reservoir, each arranged to raise the temperature of the liquid by the same amount (e.g. 25° or 30° C.), the liquid flowing past the three heating elements in series, in a reservoir in which the liquid is heated on demand.

The apparatus preferably comprises a steam pressure gauge and feedback loop connected to measure the pressure in the reservoir. When the apparatus is connected to a source of power, the relevant heating element may be arranged to heat the water until the pressure in the reservoir is above atmospheric pressure and then the feedback loop shuts off the power. The steam pressure gauge and feedback loop may control the heating to maintain the liquid at boiling point and the steam pressure above atmospheric as the liquid is used.

In a further embodiment, the apparatus of the present invention may be used to control pests such as pests on plants and/or pests on the ground. Pests on plants may include black fly and aphids. Pests on the ground may include woodlice, other pests with carapaces, slugs and snails. For the control of pests on the ground the apparatus described above may be used. However, for the control of pests on plants the apparatus is preferably modified so as to include a variable temperature control such that the water and surfactant is heated to a temperature of from 45 to 57° C., more preferably from 50 to 57° C.

The present invention also provides the use of an apparatus of the invention to control vegetation.

The present invention also provides a method of controlling vegetation which method comprises preparing a hot foam mixture comprising water and a surfactant, which acts as a foaming agent, and directing the foam onto vegetation. In a preferred embodiment the hot foam mixture further comprises steam, for example up to 10% steam, or up to 5% steam (these being proportions by weight).

The method may further comprise heating a liquid comprising water and a surfactant, which acts as a foaming agent, to a temperature of from 96° C. to 105° C., preferably at least 102° C., and optionally up to 110° C., such as 107° C. The liquid may be heated using electric power. In one embodiment the liquid is heated initially using mains power. In addition, hot water may be provided to the reservoir before heating commences, for example from a domestic hot water tap.

In one embodiment the hot foam mixture further comprises a dye, and the foam is coloured or the residue left when the foam collapses is coloured.

As the liquid is heated to form steam, the steam forces the liquid out of the nozzle of the apparatus whenever the releasing means is opened. The liquid combines with air as it leaves the nozzle forming hot foam which typically contains steam. Air dissolved in the water also comes out of solution as the water is heated and assists in forming foam. A low pressure may be used that is above atmospheric pressure, for example 120 kPa (18 psi) to 135 kPa (20 psi) (absolute pressures), but it may be up to 200 kPa or higher. The pressure may be significantly higher where a pump is also used to raise the pressure.

Foliage that is sprayed with the hot foam mixture typically dies within 1 day. This does depend on the type of plant and the amount of foam that contacts the plant. Plants that have a very waxy coating may require a larger amount of foam to impart sufficient heat to the plant. Some plants wilt and undergo a colour change within one hour.

The method of the present invention may also be used to control pests. The present invention therefore provides a method of controlling pests which method comprises preparing a hot foam mixture comprising foaming agent and water and directing the foam onto pests. The method may further comprise heating a liquid comprising water and a foaming agent to a temperature of from 96° C. to 105° C., preferably at least 102° C. where the pests are on the ground. The method may further comprise heating a liquid comprising water and a foaming agent to a temperature of from 45 to 57° C., more preferably from 50 to 57° C. where the pests are on plants or on the ground.

The invention will now be further and more particularly described, by way of example only, and with reference to the accompanying drawings, in which.

Figure 1:
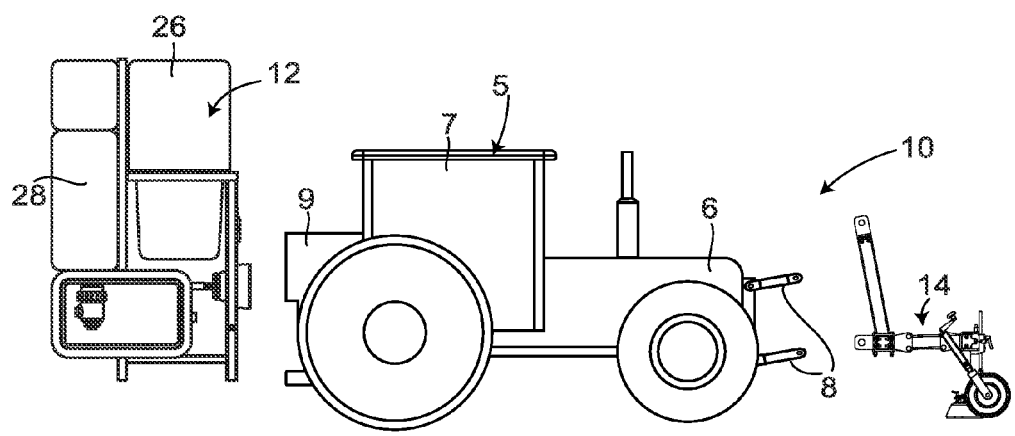
FIG. 1 shows a side view of a weed treating apparatus, also showing a tractor.

Referring to FIG. 1, there is shown a weed treating apparatus 10 and a tractor 5 (represented schematically). The weed treating apparatus 10 comprises a foam generating apparatus 12, which is intended to be mounted at the rear of the tractor 5, and a foam dispensing machine 14 which is intended to be mounted at the front of the tractor 5. It will be appreciated that the apparatus 10 might instead be mounted on a different agricultural vehicle, which may be a vehicle dedicated to this use. The foam dispensing machine 14 is envisaged as being mounted at the front of such a vehicle, as this enables the driver to align it accurately to kill weeds between rows of crops, but it will be appreciated that the two components of the weed treating apparatus 10 might instead both be mounted on a trailer to be towed behind such an agricultural vehicle.

The tractor 5 includes an engine 6, a cab 7, a three-point linkage 8 at the front, and a power takeoff 9 at the rear. Such features are conventional. The tractor 5 may also provide the facility for raising and lowering the three-point linkage 8.

Figure 2:
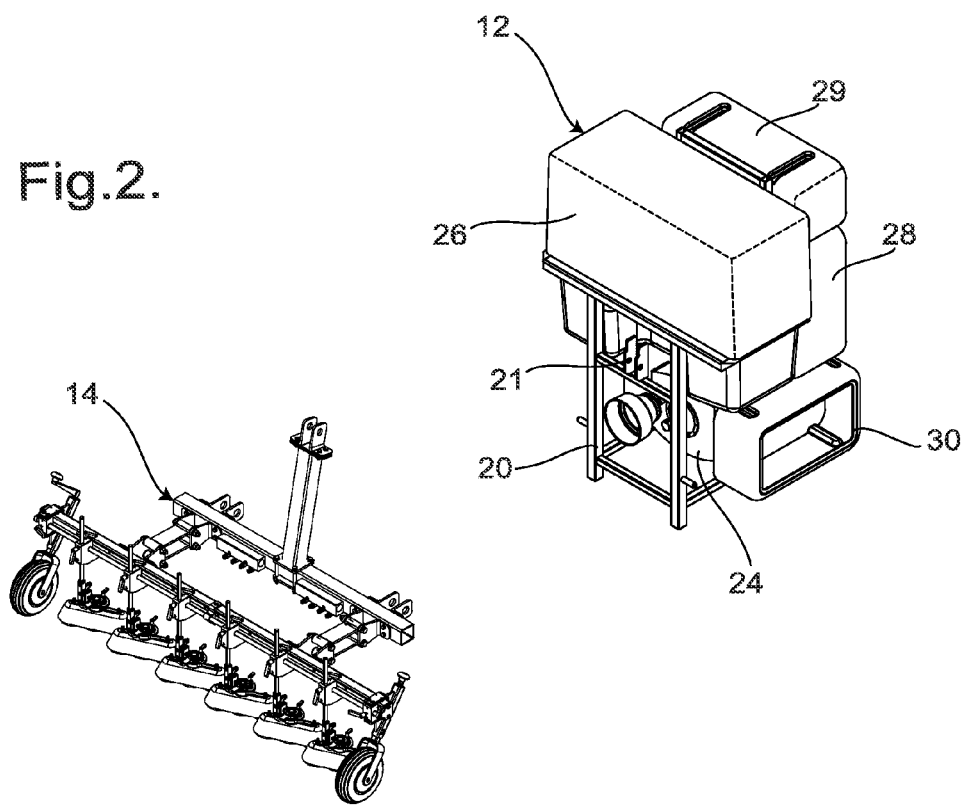
FIG. 2 shows a perspective view of the weed treating apparatus of FIG. 1.

Referring now to FIG. 2, the foam dispensing machine 14 and the foam generating apparatus 12 are shown separately, without the tractor 5. The foam generating apparatus 12 includes a steel frame 20 with a bracket 21 on the front side so it can be mounted onto the rear of the tractor 5. Within the lower part of the steel frame 20 is mounted a generator 24, which is adapted to be linked by a telescopic drive shaft with an overrun clutch to the power take off 9 from the tractor 5, so that the generator 24 is driven by the tractor's engine 6. In this embodiment the generator 24 is a three-phase 415 V generator, generating about 80 kVA. Supported by the steel frame 20 above the generator 24 is a water storage tank 26, which may for example have a capacity of 400 or 600 liters. The steel frame 20 also carries four boxes 28, 29, 30 and 31, which may be of glass fibre reinforced composite material, and which provide enclosures for electrical or electronic components.

Figure 3:
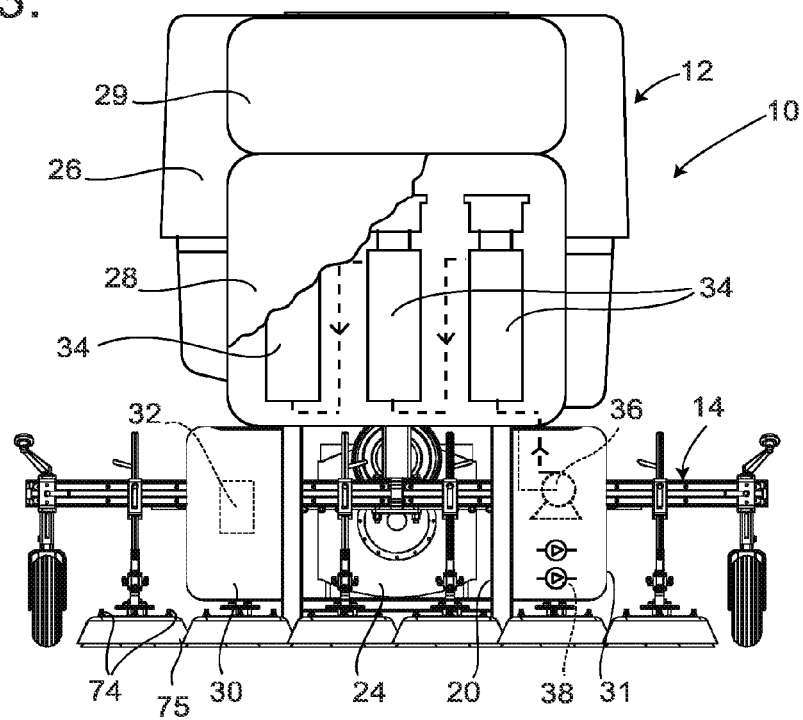
FIG. 3 shows a rear view of the weed treating apparatus of FIG. 1 (but not showing the tractor)

Referring also to FIG. 3, the box 28 (which is shown partly broken away) encloses three electrical heaters 34 each provided with thermal insulation. The box 30 on the left side (as shown) of the generator 24 encloses control electronics 32 (shown schematically in broken lines), while the box 31 on the right side (as shown) of the generator 24 encloses a pump 36 (shown schematically in broken lines) and solenoid valves 38 (represented schematically). The box 29 above the heater box 28 may also contain electronic components. Each electrical heater 34 includes an electrical heating element and a cast aluminium block.

In operation of the foam generating apparatus 12 the water which is to be heated is pumped by the pump 36 from the water tank 26 through the three electrical heaters 34 in series. Each heater 34 may have a nominal power of 24 kW, and each may be powered by a different phase of the output from the generator 24. Each heater 34 is controlled by the control electronics 32 in accordance with the flow rate of the water, so that the water temperature is raised in stages, typically by between 20° C. and 30° C. at each stage, to a final temperature between 95° C. and 105° C. or up to 110° C., which may be above 102° C., for example 107° C. The control electronics 32 monitors the water temperature at each stage, and also the temperature of the heater 34, for example using thermocouples.

The hot water emerging from the heater box 28 is at an elevated pressure for example 120 kPa (18 psi) to 135 kPa (20 psi) (absolute pressures), but more typically a higher pressure such as 400 kPa, 500 kPa, or up to 1000 kPa or 1200 kPa because of the pressure created by the pump 36. The hot water does not boil, because of the elevated pressure, until it emerges from a nozzle. By way of example the water flow rate may be up to 10 liters/minute, in this example, which can supply several foam-dispensing nozzles; but if not all the foam-dispensing nozzles are in use, the flow rate of water to the electrical heaters 34 in the heater box 28 is reduced. This may utilise an electronically-controlled valve to divert some of the water from the pump 36 back to the water tank 26.

Although the heater box 28 may be referred to as a reservoir of hot water, it contains only the water required for immediate use, as the water is heated only as it is being dispensed. That is to say, the water is heated on demand.

A surfactant such as an alkyl polyglycoside may be mixed with the liquid in the water tank 26, or it may be mixed with the water as it is passed into the heater box 28, or may be mixed with the hot water as it flows out of the heater box 28, or after it has emerged from the heater box 28. The quantity of surfactant may be about 0.1% by weight of water, typically between 0.05% and 0.5%, although it may be higher, for example 1%, 1.5% or 2%.

The solenoid valves 38 control the outflow of hot fluid through various outlet nozzles. For example hot fluid may be supplied to a hand-held spray lance with a nozzle at its end, so an operator walking alongside the tractor 5 can treat individual weeds; or hot fluid may be supplied to spray nozzles mounted behind the rear wheels of the tractor 5, so as to treat weeds growing in the wheel ruts. As the hot fluid emerges from the nozzle it forms a foam which contains steam, which blankets the surface of the weed, and kills the weed. The foam dispensing machine 14, described in more detail below, can carry several such dispensing nozzles and enables a large area to be treated easily.

Figure 4:
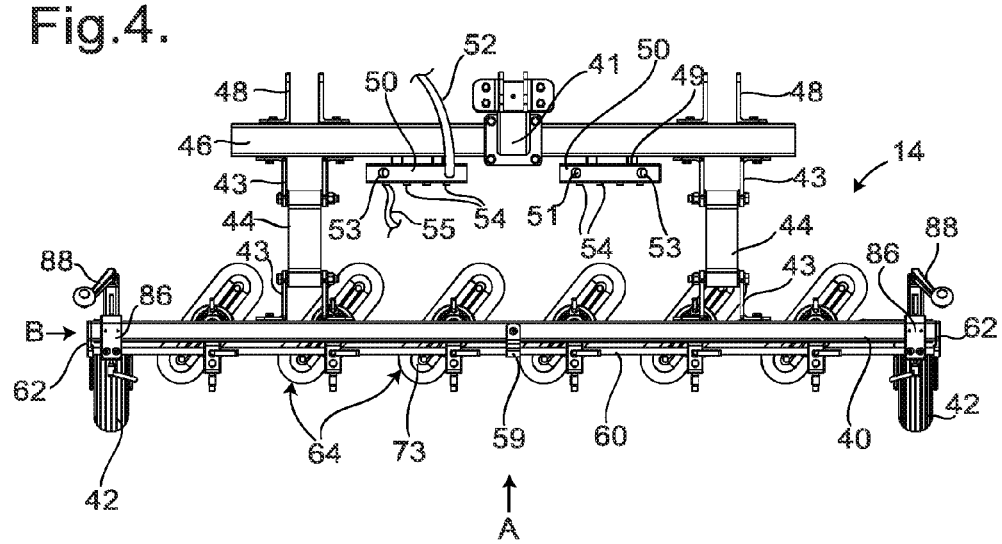
FIG. 4 shows a plan view of the foam dispensing machine of the weed treating apparatus of FIG. 1.

Referring now to FIG. 4, the foam dispensing machine 14 consists of a support bar 40 supported at each end by a wheel 42. The rear face of the support bar 40 is connected by brackets 43 and hinged parallel plate linkages 44 to a crossbar 46. The crossbar 46 carries brackets 48 and an upwardly-extending link bar 41, which enable it to be connected to the three-point linkage 8 at the front of the tractor 5.

The front face of the crossbar 46 carries two header boxes 50 on thermally insulating mounts 49, each with an inlet 51 which is connected by a hose 52 (only one is represented, schematically) to one of the solenoid valves 38; such hoses 52 may extend along the underside of the tractor 5. Each header box 50, in this example, has four outlet ports 54 to which outlet hoses 55 (only one is represented, schematically) can be connected using dry break hydraulic connectors. Each header box 50 also has an outlet 53 which is connected by a hose equivalent to the hose 52 to carry any excess liquid back to the water tank 26. Each hose 52 that extends along the underside of the tractor 5 is provided with a dry break hydraulic connector.

Figure 5:
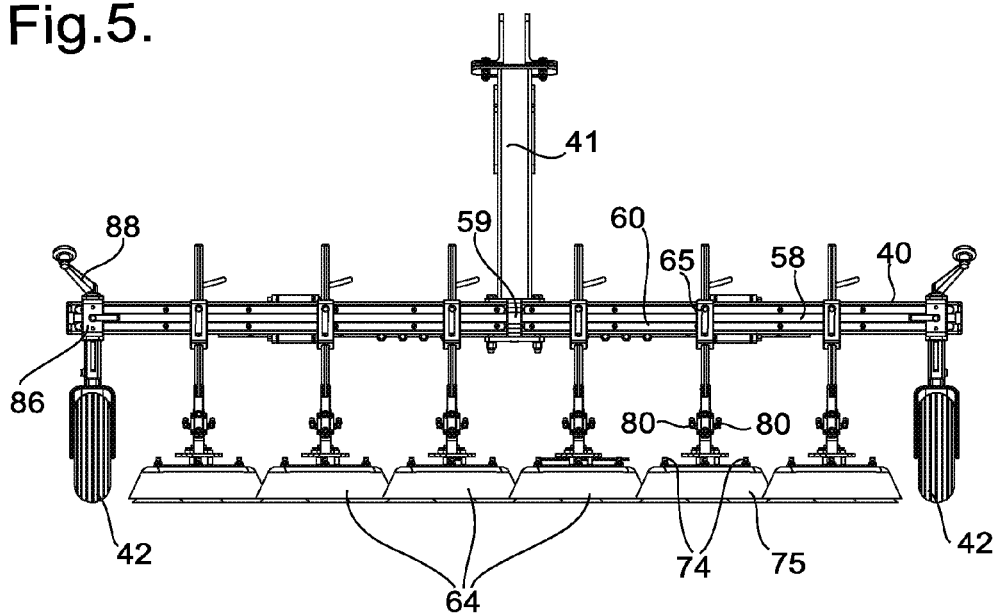
FIG. 5 shows a front view in the direction of arrow A of FIG. 4.

Referring also to FIG. 5, along the front face of the support bar 40 is fixed a nylon runner 58, and a support tube 60 is fixed a short distance in front of the nylon runner 58, supported by a bracket 59 at the middle of the support bar 40 and by end plates 62 which are bolted onto the ends of the support bar 40. Several nozzle modules 64 can be mounted along this support tube 60, six being shown in FIGS. 2 to 5.

Figure 7:
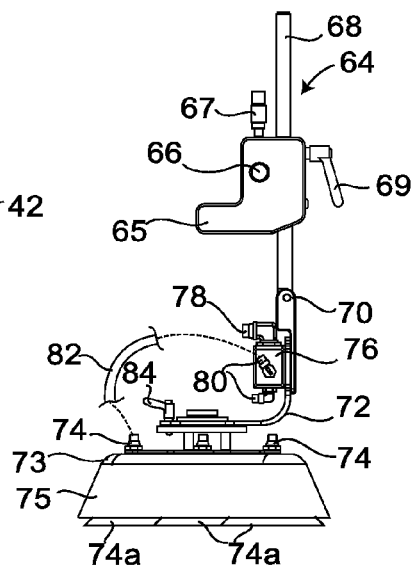
FIG. 7 shows a side view of a component of the foam dispensing machine of FIG. 4.

In FIG. 7 one such nozzle module 64 is shown in isolation. The module 64 includes an L-shaped clamping block 65 shaped to rest against the nylon runner 58 and against the underside of the support bar 40. This defines a transverse hole 66 through which the support tube 60 passes, and a clamp 67 to secure the block 65 to the support tube 60. It also defines vertical hole through which a support bar 68 can slide, and a clamp 69 to secure the support bar 68 to the block 65. The lower end of the support bar 68 is linked by a hinge 70 to a curved L-shaped bracket 72 to which a nozzle support plate 73 is connected. The nozzle support plate 73 supports three nozzles 74 spaced apart along a straight line, and arranged to spray the hot liquid below the nozzle support plate 73; in plan view, as shown in FIG. 4, the nozzle support plate 73 is lozenge-shaped, with rounded ends, but of length about five times its width. Below the nozzle support plate 73 is a flexible rubber curtain or skirt 75 which splays out. Considering the dimensions at the base of the curtain or skirt 75, the length may be 350 mm and the breadth 100 mm; it is desirable to have a ratio of length to breadth of at least 2.5 and preferably at least three, considering the region over which foam is being sprayed at any one time.

The curtain or skirt 75 may consist of a plurality of flexible rubber curtain portions each of which, along its top edge, can slide along one of two grooves adjacent to the periphery of the nozzle support plate 73, each being of length less than that of the periphery. By adjusting the positions of these curtain portions, and the extent to which they overlap each other, a gap in the skirt 75 may be provided at the rear side of the nozzle support plate 73. Consequently when the hot liquid from the foam generating apparatus 12 is dispensed through the nozzles 74, foam is generated below the nozzle support plate 73 in a space that is enclosed on the front and the sides, but is not enclosed at the rear. Each nozzle 74 generates a conical spray of foam (indicated as 74a in FIG. 7).

In addition the L-shaped bracket 72 also carries a liquid supply manifold 76, with an inlet 78 to communicate with a hose 55 from the header box 50 (see FIG. 4), and with three outlets 80 (only two of which are visible in FIG. 7) which are connected by hoses 82 (one of which is shown schematically) to the nozzles 74.

The orientation of the nozzle support plate 73 relative to the L-shaped bracket 72, and so relative to the direction of movement of the foam dispensing machine 14, can be adjusted, and can be fixed by a clamp 84.

Figure 6:
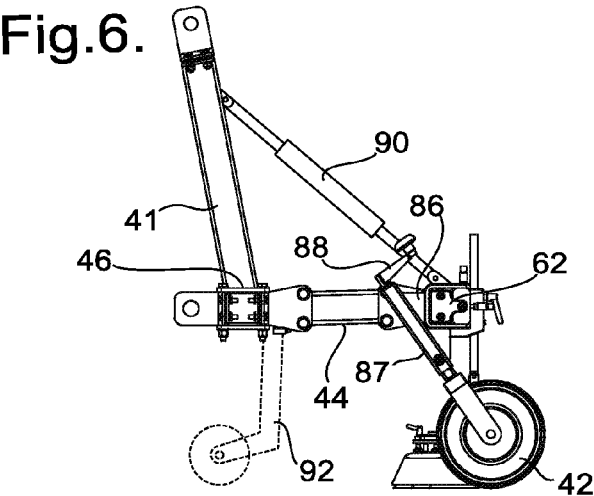
FIG. 6 shows a side view in the direction of arrow B of FIG. 4.

As shown in FIG. 6, the wheels 42 are fixed to the ends of the support bar 40 by a clamp 86 which is clamped around the support bar 40 and by an inclined shaft 87 to ensure that the wheel 42 rides up over any ruts in the ground. The inclined shaft 87 includes a jack mechanism with a handle 88 so the position of the wheel 42 relative to the support bar 40 can be adjusted.

The nozzle modules 64 are hence supported by the support tube 60. By temporarily disconnecting one end plate 62 and removing the wheel support clamp 86 some nozzle modules 64 may be removed, or additional nozzle modules 64 installed. The header boxes 50 provide a total of eight outlet ports 54, so there can be up to eight nozzle modules 64 mounted on the support tube 60. The transverse position of each nozzle module 64 can be adjusted by sliding it along the support tube 60, and then fixed with the clamp 67. The vertical height of the nozzle support plate 73 can be adjusted by raising or lowering the support bar 68, and fixed with the clamp 69. The hinge 70 ensures that the nozzle support plate 73 can swing back to clear any obstacle in its path, such as a stone.

With the nozzle support plates 73 in the orientation as shown, there are narrow gaps between the regions of the ground that are covered with foam. If the nozzle support plates 73 are adjusted so as to be aligned more closely with the direction of movement, then the gaps between the regions that are covered with foam become larger. On the other hand, if the nozzle support plates 73 are adjusted to extend at a larger angle to the direction of movement, they can be arranged so there are no gaps between the regions treated with foam. Hence the foam dispensing machine 14 can be adjusted either to treat weeds that are growing between rows of plants, or to treat an entire area.

Considering the effect of a single nozzle module 64, by adjusting the orientation of the nozzle support plate 73 the width of the ground that is treated may be varied between a minimum of about 100 mm (with the three nozzles 74 aligned with the direction of movement), up to a maximum of about 350 mm (with the three nozzles 74 aligned transverse to the direction of movement).

Typically operation of the weed treating apparatus 10 is controlled by the operator using a control panel in the cab 7. In operation the pump 36 supplies a stream of water from the water tank 26 to the electrical heaters 34 in the heater box 28, this water containing surfactant. The pump 36 controls both the pressure and the flow rate of the fluid stream. The flow rate is set in accordance with the number of nozzles 74 that are in use; the operator may for example actuate switches or touch-screen buttons within the control electronics 32 to indicate the number of operating nozzles 74. The resulting high pressure liquid stream is supplied through the solenoid valves 38 and the hoses 52 to the inlets 51 on the header boxes 50, and so through the hoses 55 to the nozzle modules 64. Any excess liquid in the header boxes 50 is recirculated back to the water tank 26.

As a desirable option the cab 7 may include a computer linked to or including a GPS aerial, and linked to the control electronics 32. Hence the computer can store data that indicates which areas have been treated, and when they were treated.

As a desirable option the foam dispensing machine 14 may include a pneumatic damper and control ram 90 which extends between the upwardly-extending link bar 41 and the support bar 40. The pneumatic damper and control ram 90 is shown schematically in FIG. 6. This has two effects. When the foam dispensing machine 14 is being moved over bumpy ground, the ram 90 dampens the bouncing movement of the support bar 40 and the components fixed to it. If the driver of the tractor 5 raises the three-point linkage 8 with the foam dispensing machine 14 attached, the ram 90 limits the extent to which the support bar 40 can drop, restricting the movement of the parallel plate linkages 44, and so enabling the driver to lift the foam dispensing machine 14 clear of the ground, for example at the end of a row of crops.

The foam dispensing machine 14 may also be provided with adjustable legs or a jockey wheel 92, as indicated in broken lines in FIG. 6, so that the crossbar 46 does not rest on the ground when disconnected from the tractor 5.

It will be appreciated that a weed killing apparatus may differ from that described in relation to the figures. For example the weed killing apparatus 10 may be installed permanently as part of a dedicated vehicle, rather than being mounted on a general-purpose vehicle such as the tractor 5. The width of the foam dispensing machine 14 may differ from that described, and it may carry a smaller number or a larger number of nozzle modules 64. Where there are a larger number of nozzle modules 64 it may be appropriate to use a water tank 26 of greater capacity, to prolong the period for which the apparatus 10 can operate without refilling.

The control electronics 32 preferably includes indicators, visible by the operator, indicating the values of parameters such as temperatures, flow rates, and pressures. In one embodiment a touch-screen controller is provided in a portable box connected via a flexible cable or umbilical cord to the control electronics 32. Such a touch-screen controller may include controls such as an on/off switch for the screen itself, an indicator to show if the power takeoff 9 is at the correct speed, and an emergency stop button to disconnect the power to the heaters 34 and the pump 36. This touch-screen controller would normally be mounted in the cab 7, for example on a sucker pad, so the operator can use it when in the cab 7. Alternatively the operator can remove the touch-screen controller and attach it elsewhere, or hold it in his hand, for example when the operator is controlling weeds using a hand-held spray lance, so he can continue to control foam production without having to climb back into the cab 7.

What is claimed:

1. An apparatus suitable for controlling vegetation which apparatus comprises a storage tank for liquid comprising water at ambient temperature; a pump to supply liquid comprising water from the storage tank to a reservoir where it is to be heated; the reservoir for hot liquid comprising a heating means to heat the liquid in the reservoir, the heating means being connectable to a power source, and being arranged to heat the liquid to a temperature above 102° C. such that the pressure would be above atmospheric pressure, the heating means comprising a plurality of heaters arranged such that the water passes through the heaters in series, so the liquid comprising water is heated successively by the heaters and the temperature is raised in a plurality of stages, so that hot liquid comprising water emerges from the heating means at a temperature above 102° C. and at an elevated pressure; release means connected to the reservoir; and at least one nozzle connected to the reservoir through the release means, arranged such that the hot liquid comprising water does not boil until it emerges from a nozzle, and such that the hot liquid combines with air as it leaves the nozzle to form a stream of foam that contains steam; each nozzle being connected to the release means via a header box, the header box being provided with an outflow to carry excess hot liquid back to the storage tank; and the apparatus being mounted on a wheeled trolley or a trailer to be propelled by a vehicle or being mounted on a vehicle.

2. An apparatus as claimed in claim 1, for use in conjunction with a vehicle, the apparatus being such that during use of the apparatus to control vegetation the vehicle provides power to the heating means.

3. An apparatus as claimed in claim 2, the apparatus comprising a generator which is driven by the vehicle, and which provides power to the heating means.

4. An apparatus as claimed in claim 2, wherein liquid in the hot-liquid reservoir is heated by a burner system which is powered by a fuel carried by the vehicle.

5. An apparatus as claimed in claim 1, also comprising means for introducing surfactant into liquid in or from the hot-liquid reservoir, before it reaches the nozzle.

6. An apparatus as claimed in claim 1, wherein the pump controls the pressure of the liquid in the reservoir.

7. An apparatus as claimed in claim 1, also comprising a shroud for the nozzle, such that the nozzle is mounted within or inside a shroud or is enclosed on at least one side by a shroud.

8. An apparatus as claimed in claim 7, wherein each shroud can be arranged to enclose respective nozzle or nozzles at the front and sides, leaving an opening at the rear, relative to the direction of movement.

9. An apparatus as claimed in claim 1, wherein each nozzle is supported by a support bar that includes a hinge, so that if the nozzle collides with an obstruction as the apparatus is moved over the ground, the nozzle can swing back to clear the obstruction.

10. An apparatus as claimed in claim 1, comprising several nozzles arranged in groups, the orientation of the group of nozzles being adjustable relative to the direction of movement.

11. An apparatus as claimed in claim 10, which is configured such that a group of nozzles, in operation, treats a region of the ground, and the ratio of width to breadth of the region treated by the group of nozzles is greater than 3.

* * * * *